Jan. 4, 1938. J. SVOBODA ET AL 2,104,499
RESILIENT SUSPENSION MEANS FOR MOTOR VEHICLES
Filed June 16, 1937 2 Sheets-Sheet 2
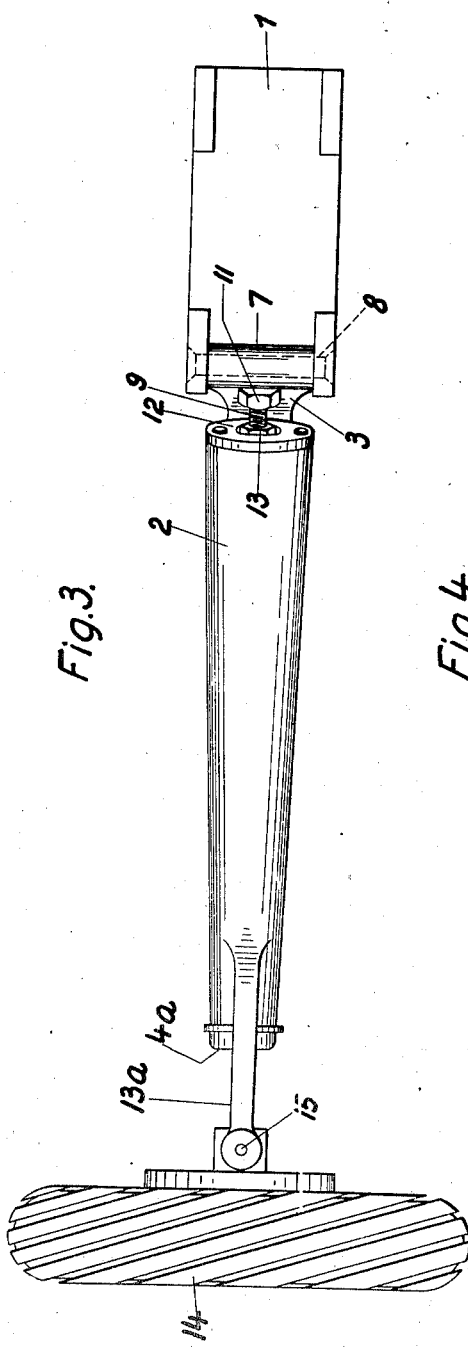
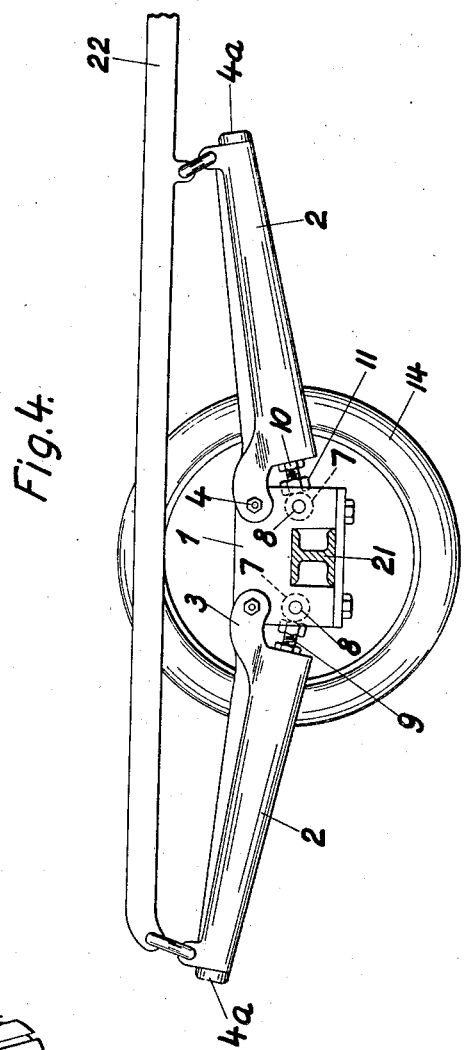
Inventors:
Jaroslav Svoboda,
Ladislav Svoboda,
Karel Bilek,
By Potter, Pierce & Scheffler,
Attorneys.

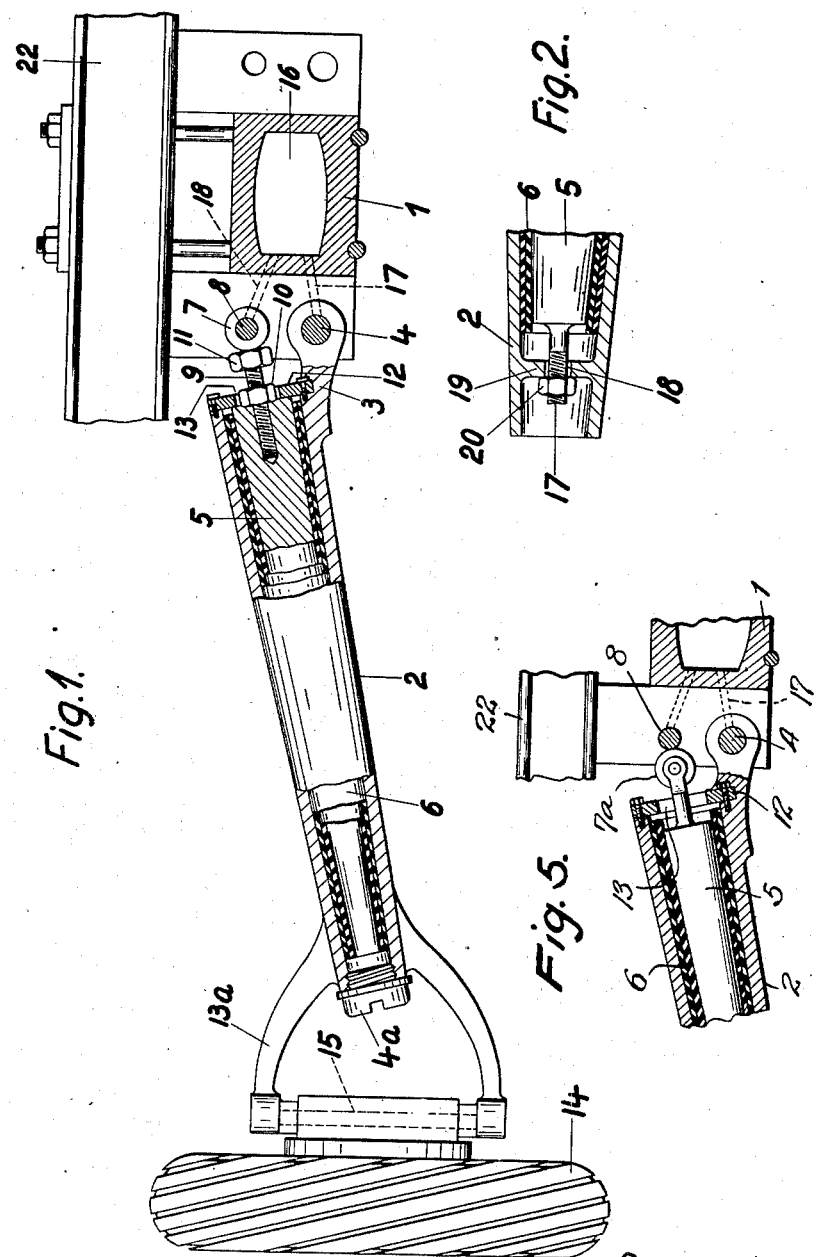

Patented Jan. 4, 1938

2,104,499

UNITED STATES PATENT OFFICE 2,104,499

RESILIENT SUSPENSION MEANS FOR MOTOR VEHICLES

Jaroslav Svoboda, Ladislav Svoboda, and Karel Bilek, Prague, Czechoslovakia

Application June 16, 1937, Serial No. 148,608
In Czechoslovakia December 19, 1935

14 Claims. (Cl. 267—21)

The present invention relates to shock absorbers or resilient suspension means particularly for application to motor or other vehicles.

It has been recognized that the use of rubber in place of the usual spring mountings to take up shock between the axles and frame of motor and other vehicles would be desirable because rubber would not only provide a resilient mounting but would also have the effect of damping the spring motion. Thus, a proper rubber mounting could replace both the springs and the usual shock absorbers ordinarily used in connection therewith.

Various vehicle suspension systems have been proposed in which rubber is employed either under pressure or in tension, but experience has shown that those in which the rubber is placed under pressure are more satisfactory. In some prior proposals employing rubber under pressure in suspension systems or shock absorbers used in connection therewith, a rubber block or mass has been employed in devices resembling plunger-oil type shock absorbers with the rubber replacing the oil. While such devices permit the use of a rather large amount of rubber, when the dimensions of the device are kept within practical limits the actual effective area utilized is not sufficient to give a satisfactory performance or to utilize to the fullest extent the desirable properties of the rubber.

The present invention is designed to overcome these and other defects and disadvantages of the prior proposals discussed above.

It is an object of the invention to provide a resilient mounting connection between the wheels and frame of a vehicle employing rubber as the resilient element and in which the entire mass of the rubber is utilized.

Another object of the invention is to provide an axle element for vehicles having built-in shock absorbing means forming a part of the axle itself.

Another object is to provide a half axle member formed as a substantially conical or tapered tube pivoted for rocking motion on the frame of the vehicle and having a tapered core or mandrel mounted therein with a resilient sleeve of rubber or equivalent material disposed between the core and the wall of the axle, the parts being so arranged that the mandrel or core engages a stationary part of the frame to arrest resiliently the rocking movement of the axle member.

Another object of the invention is to provide a shock absorbing unit for vehicles which may readily be used to replace the usual semi-elliptical or other spring members now employed between the conventional axle and chassis of vehicles.

Another object of the invention is to provide a resilient mounting connection or shock absorbing mechanism between the wheels and frame of a vehicle employing a resilient rubber element under pressure.

Other objects and advantages of the invention will become apparent as the description proceeds and upon reference to the accompanying drawings, wherein:

Fig. 1 is a sectional view illustrating a preferred embodiment of the invention, Fig. 2 is a fragmentary sectional view illustrating a detail of a modified form thereof, Fig. 3 is a plan view of the form of the invention shown in Fig. 1, Fig. 4 is a side view of another modified form of the invention, and Fig. 5 is a fragmentary sectional view illustrating another modification.

Referring now more particularly to the drawings, 1 indicates a bearing block which is secured to the frame 22 of the vehicle in any suitable manner. A pair of half axle members 2, only one of which is illustrated, are pivoted to the bearing block 1. This half axle member is in the form of substantially conical or tapered tubular casing member and is provided with a rigid arm or link member 3 at the large or base end thereof which is pivoted to the bearing block 1 by means of a pivot pin 4. The casing member 2 is preferably closed at its free end by a threaded plug 4a.

A conical or tapered mandrel or core member 5 is disposed within the tapered casing 2. The core 5 is considerably smaller in diameter than the internal diameter of the casing 2 and a resilient tapered sleeve 6 is disposed between the core and casing. The sleeve 6 is composed of rubber and preferably consists of several layers of rubber with the layers of different degrees of hardness and elasticity. The angle of the taper of the bore of the rubber sleeve 6 and of the core 5 is preferably the same. However, the angles of the tapers may be made different to secure a more gentle action at the beginning of the movement of the core relative to the casing 2.

The base or outer end of the core or mandrel 5 bears against a roller 7 which is journalled on a pin 8 mounted in the bearing block 1. The effective length of the mandrel 5 is preferably made adjustable by providing a stud 9 which is threaded into the end of the mandrel, a lock nut 10 being provided for locking the stud in adjusted position. The head 11 of the stud 9 thus constitutes a bearing member for the end of the mandrel and engages the roller 7. A cover plate 12 having a central aperture 13 for the passage of the stud 9 is fastened onto the end of the casing 2.

A pair of arms 13a rigid with the casing 2 form a yoke for mounting the wheel 14, the vertical pivot member 15 of the wheel mount being pivoted in the ends of the arms 13a.

To provide for lubrication of the roller 7 and the pivoted mounting of the casing 2, the bearing block 1 is formed with a recess 16 adapted to be filled with oil and is provided with drilled passages 17 and 18 leading from the recess to the pivot pins 4 and 8, respectively.

It will be noted that the arm or link 3 carried by the axle member 2 is offset from the center line or axis of said axle so that when the weight of the vehicle is placed on the wheels, the axle will rock bodily about the pivot 4 until the end 11 of the mandrel 6 engages the roller 7. Continued motion is then resiliently retarded as the mandrel is forced more and more into the bore of the casing 2 compressing the interposed rubber sleeve 5 which supports the weight.

In the operation of the vehicle, as the wheel moves up and down due to irregularities in the roadway, the mandrel 5 moves back and forth a limited amount within the casing or axle, decreasing or increasing the pressure on the rubber sleeve 6 so that the latter provides a resilient action and at the same time absorbs vibration.

In the modification shown in Fig. 2, the inner end of the mandrel is provided with a threaded stem 17 extending through a central opening 18 formed in a transverse wall 19 adjacent the free end of the axle casing 2. A nut 20 is threaded on the stem 17 and is adjustable thereon to limit the outward movement of the mandrel.

In the modification shown in Fig. 5, the roller, corresponding to the roller 7 of Fig. 1, is mounted at the end of the mandrel 6 in the form of a sleeve 7a bearing against the pin 8.

The same arrangement of conical casing, mandrel and resilient sleeve as above described may also be substituted for the ordinary semi-elliptical or other steel springs when it is desired to use a conventional axle structure. In such a case, the bearing block 1 or its equivalent is mounted on the axle 21 and the free ends of the casings 2 are connected to the frame 22 of the vehicle to carry the weight thereof, or vice versa (Fig. 4).

It will be readily apparent that the apparatus as described and shown is very simple, inexpensive to manufacture and is light in weight. It is also to be noted that the stress is distributed over a very large area so that a large mass of rubber is utilized in the spring action. Due to the large area of contact of the rubber sleeve with the mandrel and casing, the wear of the parts will be slight and the spring effect will be very gentle and easy. The rubber sleeve member can easily be removed and replaced by another when worn.

While preferred embodiments of the invention have been shown and described for purposes of illustration, it is to be understood that other modifications may be resorted to and that various changes in the details of construction may be made without departing from the spirit of the invention within the scope of the claims.

We claim:

1. In a vehicle, a frame member, a wheel mounting member, an arm pivoted at one end to one of said members and secured at the other end to the other of said members, said arm having a tapered recess in one end thereof, a tapered mandrel extending into said recess, and a resilient sleeve element interposed between said mandrel and the walls of said recess, the outer end part of said mandrel bearing against the member to which said arm is pivoted.

2. A combined resilient suspension and shock absorber for vehicles comprising a frame member, a half axle member pivoted to said frame member, said half axle member having a longitudinal tapered recess offset from said pivot, a tapered mandrel in said recess, and a resilient rubber sleeve member in said recess surrounding said mandrel to resiliently restrain relative movement of said mandrel and axle member, said mandrel having an end bearing portion in contact with said frame member.

3. A combined resilient suspension and shock absorber for vehicles comprising a frame member, an elongated casing member having a tapered recess opening on one end thereof, said casing member being pivoted at one end to said frame member to swing about a point offset from the open end of said recess, a wheel mounting connected to the other end of said casing, a resilient tapered rubber sleeve inserted in said recess, and a tapered mandrel inserted in said sleeve having a projecting portion contacting said frame member.

4. A device according to claim 3, wherein said rubber sleeve consists of a plurality of concentric layers of rubber of different degrees of resiliency.

5. In a resilient vehicle suspension means, a bearing block carried by the vehicle frame, an elongated casing member having a substantially conical recess opening at one end thereof, said casing member being pivoted to said bearing block on a line offset from and at right angles to the axis of said recess, a resilient rubber sleeve member inserted in said recess, a substantially conical mandrel element inserted in said rubber sleeve, said mandrel having a projecting bearing part contacting said bearing block, and a wheel mounting connected to the free end of said casing.

6. In a resilient vehicle suspension means, a bearing block carried by the vehicle frame, an elongated casing member having a substantially conical recess opening at one end thereof, said casing member being pivoted to said bearing block on a line offset from and at right angles to the axis of said recess, a resilient rubber sleeve member inserted in said recess, a substantially conical mandrel element inserted in said rubber sleeve, a bearing roller journalled on said bearing block, said mandrel having a projecting bearing part adapted to engage said bearing roller, and a wheel mounting connected to the free end of said casing member.

7. A device according to claim 2, wherein said bearing portion carried by said mandrel is adjustable longitudinally to vary the length of said mandrel.

8. In a resilient vehicle suspension means, a bearing block carried by the vehicle frame, an elongated casing member having a substantially conical recess opening at one end thereof, said casing member being pivoted to said bearing block on a line offset from and at right angles to the axis of said recess, a resilient rubber sleeve member inserted in said recess, a substantially conical mandrel element inserted in said rubber sleeve, a bearing roller journalled on said bearing block, said mandrel having a longitudinally adjustable projecting bearing part adapted to engage said bearing roller, and a wheel mounting connected to the free end of said casing member.

9. In a vehicle, a swinging half axle member pivoted to the frame of the vehicle, said axle member having a longitudinally extending tapered recess opening at its large end toward said vehicle frame and offset from said pivot, a rubber sleeve inserted in said recess and a tapered mandrel inserted in said sleeve having a projecting end portion in engagement with said frame.

10. In a vehicle, a swinging half axle member pivoted to the frame of the vehicle, said axle member having a longitudinally extending tapered recess opening at its large end toward said vehicle frame and offset from said pivot, a rubber sleeve inserted in said recess, a tapered mandrel inserted in said sleeve, and a longitudinally adjustable bearing part carried by the projecting end of said mandrel adapted to engage said frame.

11. In a vehicle, a bearing block carried by the vehicle frame, a swinging half axle member pivoted to said bearing block, said axle member having a longitudinally extending tapered recess opening at its larger end toward said bearing block and offset from said pivot, a resilient rubber sleeve inserted in said recess, a tapered mandrel inserted in said rubber sleeve, and a roller journalled on said bearing block, said mandrel having a projecting end portion adapted to engage said roller.

12. A device according to claim 11 in which the projecting end portion of said mandrel is longitudinally adjustable to vary the length of said mandrel.

13. In a resilient vehicle suspension means, a bearing block carried by the vehicle frame, an elongated casing member having a substantially conical recess opening at one end thereof, said casing member being pivoted to said bearing block on a line offset from and at right angles to the axis of said recess, a resilient rubber sleeve member inserted in said recess, a substantially conical mandrel element inserted in said rubber sleeve, a bearing roller journalled on said bearing block, said mandrel having a projecting bearing part adapted to engage said bearing roller, and a wheel mounting connected to the free end of said casing member, said bearing block having a lubricant recess formed therein and passages leading from said recess to the pivots for said casing member and said roller.

14. A device according to claim 11 in which the projecting end portion of said mandrel is longitudinally adjustable to vary the length of said mandrel, said bearing block having a lubricant recess formed therein and passages leading from said recess to the pivots for said casing member and said roller.

JAROSLAV SVOBODA.
LADISLAV SVOBODA.
KAREL BILEK.